DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 26, 1973

911 O.G. 1138

T911,017
RECONSTITUTED TOBACCO
Eugene D. Klug, Wilmington, Del., assignor to Hercules Incorporated, Wilmington, Del.
Filed June 13, 1972, Ser. No. 262,390
Int. Cl. A24b *3/14*
U.S. Cl. 131—17 A
No Drawing. 9 Pages Specification

An improved reconstituted tobacco is disclosed having as a binder a modified hydroxypropyl cellulose having a cloud point less than about 30° C. Phenylhydroxyethyl-, benzyl- and hydroxybutyl hydroxypropyl cellulose are preferred modifications. Tobacco products based on such materials are less moisture-sensitive when in contact with the user's lips than are those based on presently used binder systems. Since the binders are both thermoplastic and water-soluble, the reconstituted tobacco can be processed by either thermal or solution techniques.